United States Patent
Bridges et al.

[11] Patent Number: 5,621,845
[45] Date of Patent: Apr. 15, 1997

[54] APPARATUS FOR ELECTRODE HEATING OF EARTH FOR RECOVERY OF SUBSURFACE VOLATILES AND SEMI-VOLATILES

[75] Inventors: Jack E. Bridges, Park Ridge; Guggilam C. Sresty, Burbank, both of Ill.

[73] Assignee: IIT Research Institute, Chicago, Ill.

[21] Appl. No.: 444,228

[22] Filed: May 18, 1995

Related U.S. Application Data

[62] Division of Ser. No. 831,589, Feb. 5, 1992, Pat. No. 5,420,402.

[51] Int. Cl.[6] ............................. H05B 3/03; H05B 6/54; E21B 36/04
[52] U.S. Cl. .......................... 392/303; 392/306; 392/338; 219/772; 219/780; 166/60
[58] Field of Search ..................... 219/772, 770, 219/778, 779, 780; 166/245, 248, 60, 65.1, 267; 392/301, 302, 303, 305, 306, 307, 338

[56] References Cited

U.S. PATENT DOCUMENTS

| | | | |
|---|---|---|---|
| 4,037,655 | 7/1977 | Carpenter | 166/248 |
| 4,487,257 | 12/1984 | Dauphine | 168/60 |
| 4,545,435 | 10/1985 | Bridges et al. | 166/248 |
| 4,670,634 | 6/1987 | Bridges et al. | 219/770 |
| 4,956,535 | 9/1990 | Buelt et al. | 219/772 |
| 5,046,559 | 9/1991 | Glandt | 166/248 |

*Primary Examiner*—Philip H. Leung
*Attorney, Agent, or Firm*—Fitch, Even, Tabin & Flannery

[57] ABSTRACT

Improved methods and apparatus are disclosed for confining ohmic heating currents to a subsurface formation in the use of in situ ohmic heating for recovery of volatile and semi-volatile materials, such as hazardous waste, hydrocarbon-like materials, and valuable minerals having thermally responsive properties. Spacing between emplaced electrodes and the number of electrodes employed are controlled to cause coupling between electrodes for more uniform and higher temperature heating. Electrode designs are disclosed which suppress spurious earth currents which would heat other formations not of interest. Suppression of electrode end currents is accomplished by the use of distinct rings of insulation, control of the applied potential along the electrode, and injection or withdrawal of fluids at distinct locations along the electrode.

4 Claims, 10 Drawing Sheets

APPARATUS FOR ELECTRODE HEATING OF EARTH FOR RECOVERY OF SUBSURFACE VOLATILES AND SEMI-VOLATILES

This is a division of application Ser. No. 831,589, filed Feb. 5, 1992, U.S. Pat. No. 5,420,402.

BACKGROUND OF THE INVENTION

This invention relates to improved electrical methods and apparatus for heating the soil or subsurface formations to remove volatile or semi-volatile contaminants or petroleum substances. The electrical heating of sites containing such hydrocarbonaceous or thermally responsive materials generally requires the use of oppositely polarized, equally spaced electrodes of about the same length embedded vertically into the formation. Such electrodes are frequently powered by multi-phase power frequency sources comprising various combinations of Wye and Delta transformers. In this invention, arrangements and designs of electrodes are disclosed which suppress current pathways which would tend to bypass the formation to be heated. By such suppression, greater efficiency is achieved in heating, in contaminate or product recovery and in economic operation.

One application of this invention will be to more effectively and efficiently assist in the removal of hydrocarbon-like contaminants, particularly volatile contaminants such as gasoline and TCE. Another application of this invention would be to assist in the in situ extraction of various thermally responsive minerals such as heavy oil or sulfur.

One current method of decontaminating sites contaminated by hydrocarbons, especially for those containing semi-volatiles and high boilers, comprises excavating the entire site and burning all excavated site materials in a portable incinerator. Such a method becomes exorbitantly costly if the site is extensive and may be impracticable if the contaminated site is deep.

Another system has been developed which applies reduced pressure or a vacuum to the formation for in situ remediation of soils contaminated with volatile hydrocarbons such as gasoline or trichlorethylene. This is generally referred to as vacuum extraction technology, abbreviated as VET. This involves drilling a well into the vadose zone of the earth and applying a vacuum via the wells to volatilize and collect the contaminants. Multiple wells are used for large contaminated sites. Injection wells are sometimes used in combination with recovery wells. A common drawback is the inability to economically treat sites containing less volatile materials such as jet fuels. Another difficulty is the relatively long period of time required to extract the contaminants with a high degree of recovery. Yet another limiting factor is the high cost of treating the effluent materials which may contain hazardous components, because of the dilute nature of the contaminants in the effluent stream. Such systems are described in U.S. Pat. No. 4,183,472 to Knopik, U.S. Pat. Nos. 4,593,760 and 4,660,639 to Visser and Malot, U.S. Pat. No. 4,442,901 to Zison, and U.S. Pat. No. 4,730,672 to Payne, which all disclose variations on the vacuum extraction system. In all these cases, the formation is processed at ambient temperatures.

One way mitigate the difficulties with the VET method is to volumetrically heat the formation of interest. This can be done electromagnetically either with low frequency ohmic heating, or high frequency dielectric heating.

Electromagnetic or radio frequency (RF) heating of earth media or formations containing hydrocarbons or noxious volatile wastes has been the subject of investigation over the last 10 to 20 years. The objective has been to heat the formation to assist in the removal of valuable materials such as oil, or noxious materials such as solvents and liquid fuels. Current in situ electromagnetic heating technology falls into two major categories: A) bound-wave heating (either low or high frequency), and B) radiated wave heating (high frequency only).

Bound-wave heating structures are those in which the wave is largely contained within a specified volume and is not permitted to radiate significant amounts of energy. The original purpose of radiated wave structures (antenna), on the other hand, was to radiate waves into a lossless dielectric, such as air. Examples of the bound-wave approach appear in U.S. Re-Issue Pat. No. 30,738, and in U.S. Pat. Nos. 4,140,180, 4,144,935, 4,499,585, 4,498,535 and 4,670,634. The successful application of the bound-wave process using the high frequency version is discussed in "Development of the IIT Research Institute RF Heating Process for In Situ Shale/Tar Fuel Extractions—An Overview", presented at the Fourteenth Oil Shale Symposium, Colorado School of Mines, Golden, Colo., April 1981 by R. D. Carlson, et al. The successful use of a high frequency version of the bound-wave heating to decontaminate hazardous waste spills appears in "Radio Frequency Enhanced In Situ Decontamination of Soils Contaminated with Halogenated Hydrocarbons", presented in the proceedings of the Twelfth Annual Research Symposium, U.S. EPA, Apr. 21–22, 1986, U.S. EPA Publication No. EPA/600/9-86/022 by H. Dev.

Direct application of radiated wave technology to heating lossy media such as soil has not achieved the same degree of success as bound-wave methods. Examples of direct application of antenna technology, intended for radiation in lossless media such as air, to heating lossy media appear in U.S. Pat. Nos. 4,301,865, 4,140,179, 4,457,365, 4,135,579, 4,196,329, 4,487,257, 4,508,168, 4,513,815, 4,408,754, 4,638,863, 2,757,738, 4,228,851, 3,170,519, and 4,705,108.

The lack of reported success in using the radiated wave approach in highly conducting earth media (as opposed to air) may be attributed to several possibilities. One possibility is that far field radiated wave technology, which was originally developed for radiation into lossless media such as air, has been incorrectly adapted for media which are highly conducting. Another possibility originates in the misconception that hydrocarbon material can be selectively heated to high temperatures, regardless of the soil matrix, even though such material is both finely divided and widely dispersed in the matrix. Such a misconception may have led to impractical equipment and negative results. An example of a radiating antenna structure designed to recover hydrocarbons (either contaminants or fuels) embedded in lossy earth is described in U.S. Pat. No. 5,065,819.

In these high frequency methods, electrical energy is applied to the formation to heat the formation volumetrically, preferably as uniformly as possible. Such heating increases the vapor pressure of the contaminants. If enough heat is supplied, water will also be evaporated to create a steam sweep which further enhances contaminant removal. The volatilized contaminants are collected in a tent-like vapor barrier over the site, and then the contaminants are removed from the vapor stream. Such systems have been disclosed in U.S. Pat. No. 4,670,634 to Bridges, et al., and are further described in the publication by H. Dev entitled "In Situ Radio Frequency Heating Process for Decontamination of Soil", presented in Solving Hazardous Waste Problems presented at the 191st meeting of the American Chemical Society in April 1986.

The foregoing references describe in situ heating systems which are designed to vaporize the water in order to extend the range or reach of the heating pattern. Another objective of vaporizing the water is that it creates a steam sweep system wherein the presence of steam dries out hydrocarbon contaminants which have a boiling point well in excess of the temperature of the formation. For example, where approximately 25 tons of the formation was heated to a temperature of 150° C., it was possible, by the use of a steam sweep, to remove nearly 80% of the hydrocarbon contaminants with boiling points near 300° C. or above. Such systems can effectively remove semi-volatiles such as diesel and jet fuel and high boilers such as PCBs and PCPs.

There are presently also large volumes of earth that are contaminated with gasoline, TCE or carbon tetrachloride. These are considered volatiles, with boiling points close to that of water. Other methods may be used in these circumstances. One method to extract volatiles comprises forcing air through the formation to cause the volatiles to evaporate. The difficulty with this particular process is that it takes a great deal of time to extract the volatiles at normal earth temperatures. Also, the hydrocarbon concentration of the volatiles in the effluent stream is quite small, thereby complicating the effluent treatment process.

Heating the formation to temperatures somewhat below the vaporization point of water enhances the rate of hydrocarbon extraction. This will have at least two major advantages. First, the rate of evolution of hydrocarbons is increased, and second, the concentration of hydrocarbons in the effluent stream is not diluted by water vapor, thereby decreasing the cost of effluent treatment.

One method to heat the formation would be to use high frequency energy as previously discussed. However, while this may be cost effective when higher temperatures are required, it can be costly inasmuch as the conversion of AC energy to RF energy exhibits some loss of efficiency and the RF generator and related high frequency equipment represent high capital costs.

Alternatively, 60 Hz ohmic heating may be used to heat such a formation. In such circumstances, electrodes are placed in the formation and excited by 60 Hz voltages. These cause 60 Hz currents to flow through the formation, thereby heating the formation. Depending on the nature of the electrodes, row spacing and heating time, it may be possible to heat the formation sufficiently, if not uniformly, throughout so as to make the in situ venting or air stripping system far more effective.

One high temperature method is described by Brauns, et al. in U.S. Pat. No. 4,376,598, by Buelt, et al. in U.S. Pat. No. 4,957,393, by Timmerman in U.S. Pat. No. 5,024,556, and Carter in U.S. Pat. No. 5,004,373. These inventions are designed to heat the soil well above 100° C., the vaporization point of water. Two or more electrodes are installed vertically around the contaminated soil to be treated. By means of nonaqueous but highly conductive material placed on the surface of the soil or within the soil itself, conduction currents between electrodes excited by 60 Hz potential are maintained until the soil itself becomes sufficiently conductive at temperatures well above 300° C. to maintain significant current flows. No considerations are given to optimizing the systems to efficiently heat the soil at temperatures below 100° C. or to remove organic-like volatile or semi-volatile contaminates at temperatures below 100° C.

Other examples of the use of 60 Hz ohmic heating of earth formations are found in Perkins U.S. Pat. No. 3,958,636, Pritchett in U.S. Pat. No. 3,948,319, Todd in 4,084,637, and Kern in U.S. Pat. No. 4,010,799. All disclose methods to heat subterranean formations by means of emplaced electrodes excited by 60 Hz energy. All of the foregoing inventors describe the use of sparsely-spaced, vertically-emplaced electrodes, where the length of each electrode is considerably smaller than the spacing between the electrodes. However, many novel ways of exciting these electrodes are presented. For example, Pritchett describes a method of electrical multi-phase excitation of electrodes in triangular or hexagonal arrays.

Such sparsely-spaced electrodes result in overheating near the electrodes and underheating midway between the electrodes. Dense arrays of rows of vertical electrodes have been developed and tested which mitigate the excessive over-and-underheating effects associated with sparse arrays. A dense array is defined as an array in which the separation between rows is larger than the separation between electrodes within the rows. An additional feature of such dense arrays is that the extent of the rows of excited electrodes may be symmetrically less (both transversely and longitudinally) than the extent of the grounded rows of electrodes. Such a dense array excited by power frequency sources is described by Bridges, et al. in U.S. Pat. No. 4,545,435 and this approach is a special case of the nearly uniform heating approaches described by Bridges, et al. in U.S. Pat. No. Reissue 30,738. Limiting the extent of the exciter row dramatically reduces the flow of currents and related heating into formations of no interest.

However, in some situations, the use of oppositely polarized electrodes of about the same length, spaced equidistant from one another may be advantageous. Yet, methods and equipment to heat earth formations by such electrode arrangements without excessive temperature disparities are lacking. A major difficulty exists with sparsely-spaced electrode arrays where the spacing between the electrodes is substantially greater than the length of the electrode. Under these conditions, the mutual impedance between the electrodes is small or virtually non-existent and, as a result, each electrode acts as an independent source of heat which only heats the soil immediately surrounding the electrode. Under such conditions the charge distribution on the electrode is not influenced by adjacent electrodes because of the large distance between the electrodes. As a consequence, the charge distribution is circumferentially uniform, field enhancement effects occur near the ends of the electrodes, and the excess charge distribution near the ends of the electrodes causes the current to flow in a vertical direction rather than in a direction between the electrodes themselves. As a consequence, only the volume immediately surrounding the electrode is heated to a significant degree.

What is needed is an improved ohmic heating array design, wherein the flow of currents and related heating into formations of no interest is suppressed, and furthermore, a more even heating of the formation is achieved.

SUMMARY OF THE INVENTION

The object of the present invention is to provide improved electrical methods and apparatus for heating the soil or subsurface formations to remove volatile or semi-volatile contaminants or valuable petroleum-like substances or any other thermally responsive valuable or noxious material. Electrical heating of such formations may require the vertical emplacement of oppositely polarized, equally spaced, electrodes of about the same length. Methods and apparatus are described to generate an economic heating pattern by controlling the diameter, length, and spacing between the electrodes to suppress spurious current pathways.

In addition, the specific design features of the electrodes are also modified so as to further control and suppress the spurious or inefficient current pathways. These modifications include the addition of insulated sections along the electrode, the ability to inject water or withdraw air in a distributed fashion along the electrode and, lastly, means for applying different potentials to distinct, electrically isolated segments of the electrode. The invention also includes limiting the power applied to each electrode to avoid excessive evaporation of water, and the subsequent necessity of injecting more water, which is inefficient and often impractical.

It is therefore a principal object of this invention to provide an improved and cost-effective method of heating subsurface formations containing hydrocarbon-like components.

It is another object to combine the improved heating technology with other hydrocarbon product recovery techniques, such as the vacuum extraction technology, to provide a more economic and effective recovery method for sites containing volatile hydrocarbons.

Another object is to identify electrode array design features which can take advantage of low-cost multi-phase electrical power sources while, at the same time, making efficient use of the electrical power.

Another object is to specify and control levels of input power which can be applied and will minimize evaporation of water near the electrodes.

Another object is to identify specific electrode designs which will effectively operate in heterogeneous formations in combination with a VET waste extraction method.

Another object is to suppress current pathways which would otherwise heat formations of little interest.

Another object is to provide methods and apparatus to control the current distribution along the electrode to overcome variations in the physical characteristics within the heated formations.

Another object is to provide improved methods of establishing and maintaining ionic current pathways between the electrode and the deposit.

These and other aspects, objects and advantages of the present invention will become apparent from the following detailed description, particularly when taken in conjunction with the accompanying drawings.

DETAILED DESCRIPTION OF PREFERRED EMBODIMENTS

Figure 1:
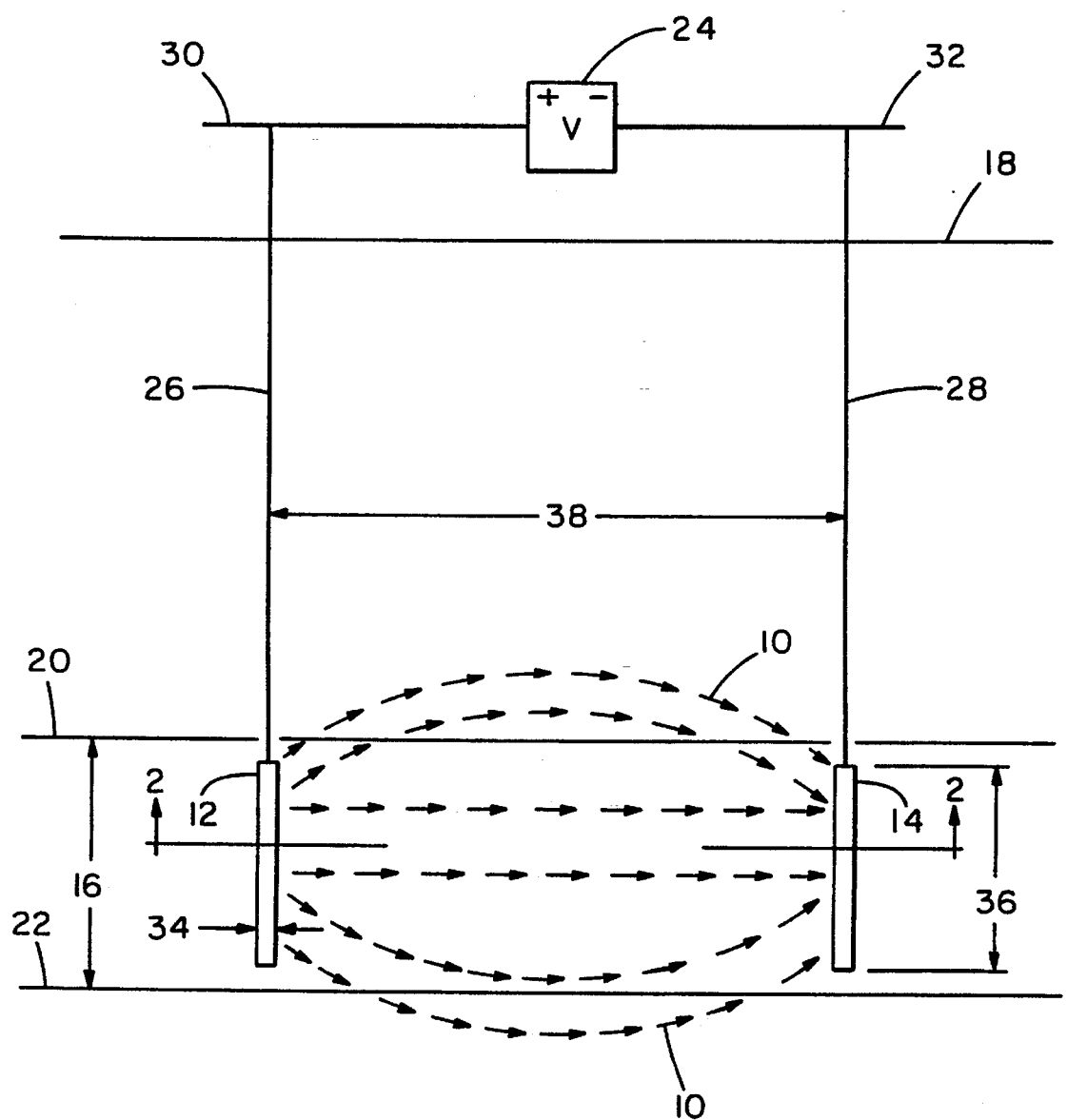
FIG. 1 is a vertical sectional view from the prior art of current flow pathways around the electrodes of an in situ ohmic heating apparatus, as incorrectly understood in the prior art.

Current pathways in situ between two vertically emplaced electrodes are inaccurately understood in the prior art to flow as shown in FIG. 1. Therein is illustrated an example of the prior art which shows incorrect current flow pathways 10 between two electrodes 12 and 14 emplaced vertically in the formation 16 to be heated. These electrodes are emplaced beneath the surface 18 of the earth and between the top 20 and bottom 22 of the formation to be heated. This section between levels 20 and 22 is the formation 16 to be processed. The electrodes are placed at oppositely polarized potential via energy from voltage source 24 via insulated cables 26 and 28 which are connected to the electrodes 12 and 14. Additional excitation potentials may be applied via cables 30 and 32 to the electrodes from voltage sources not illustrated. The diameter 34, the length 36 of the electrode, and the spacing 38 between the electrodes are important design parameters for the array.

Figure 2:
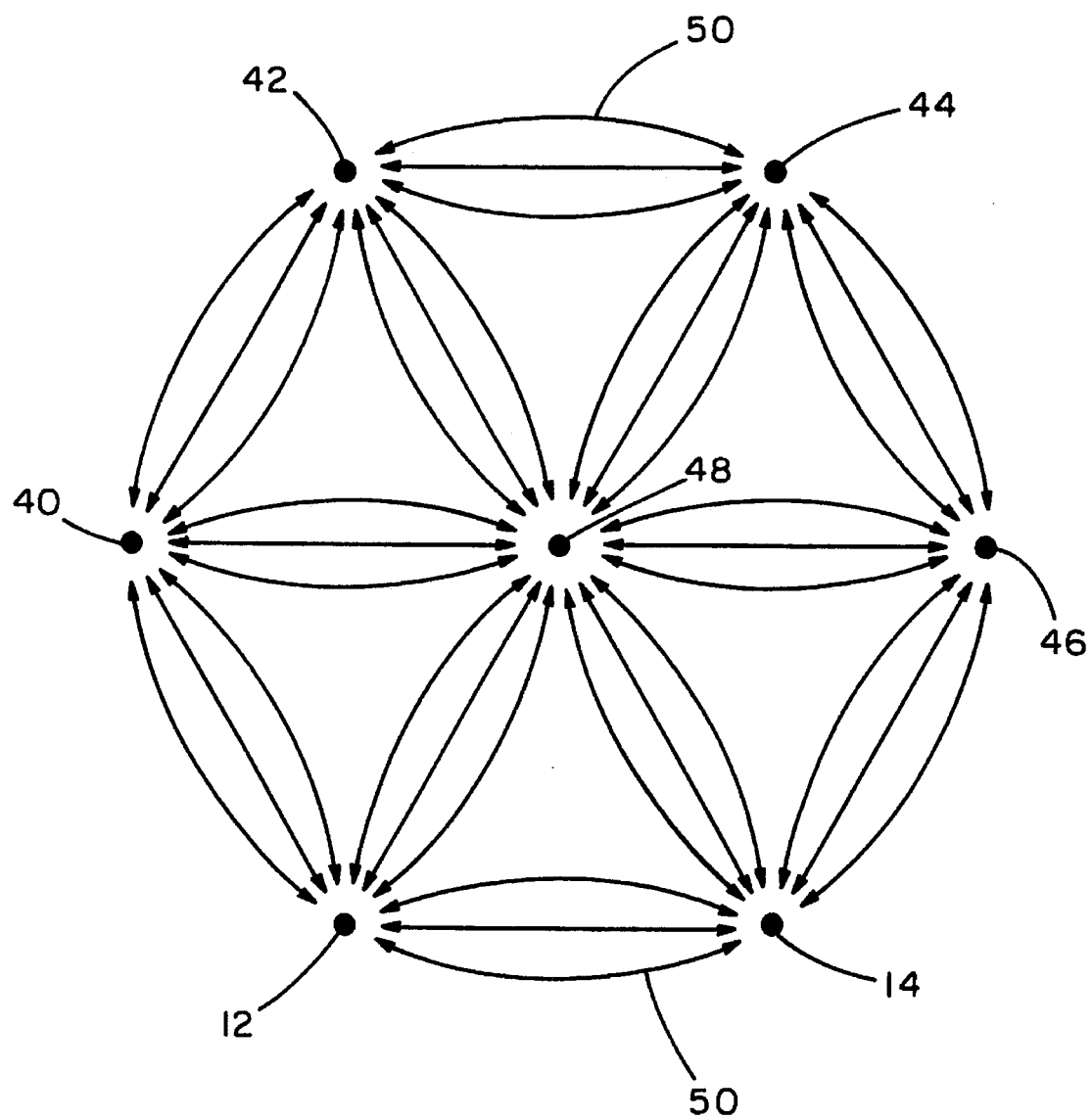
FIG. 2 is an horizontal sectional view from the prior art of current flow pathways around the electrodes of the apparatus at line 2-2' illustrated in FIG. 1.

FIG. 2 shows a horizontal cross-section 2—2' from FIG. 1 at the mid-point of the electrodes 12 and 14. Also shown are the electrodes 12 and 14 of FIG. 1 and additional electrodes 40, 42, 44, 46, and 48. The current pathways 50 are shown which arise from a potential applied between each of the electrodes either simultaneously or via multi-phase 60 Hz sources formed by combinations of Delta and Wye transformers, or sequentially by simply applying a single potential sequentially between the various electrodes. The sum of the heating effects of these various current pathways are sometimes argued to give a reasonably uniform heating pattern, although both empirical and analytical evidence does not support this view. The more or less uniform heating results of laboratory tests employing such electrode arrays confined in containers are often cited. However, the container precludes the presence of the spurious current pathways above and below the level of the electrodes which give rise to very non-uniform heating.

Figure 3:
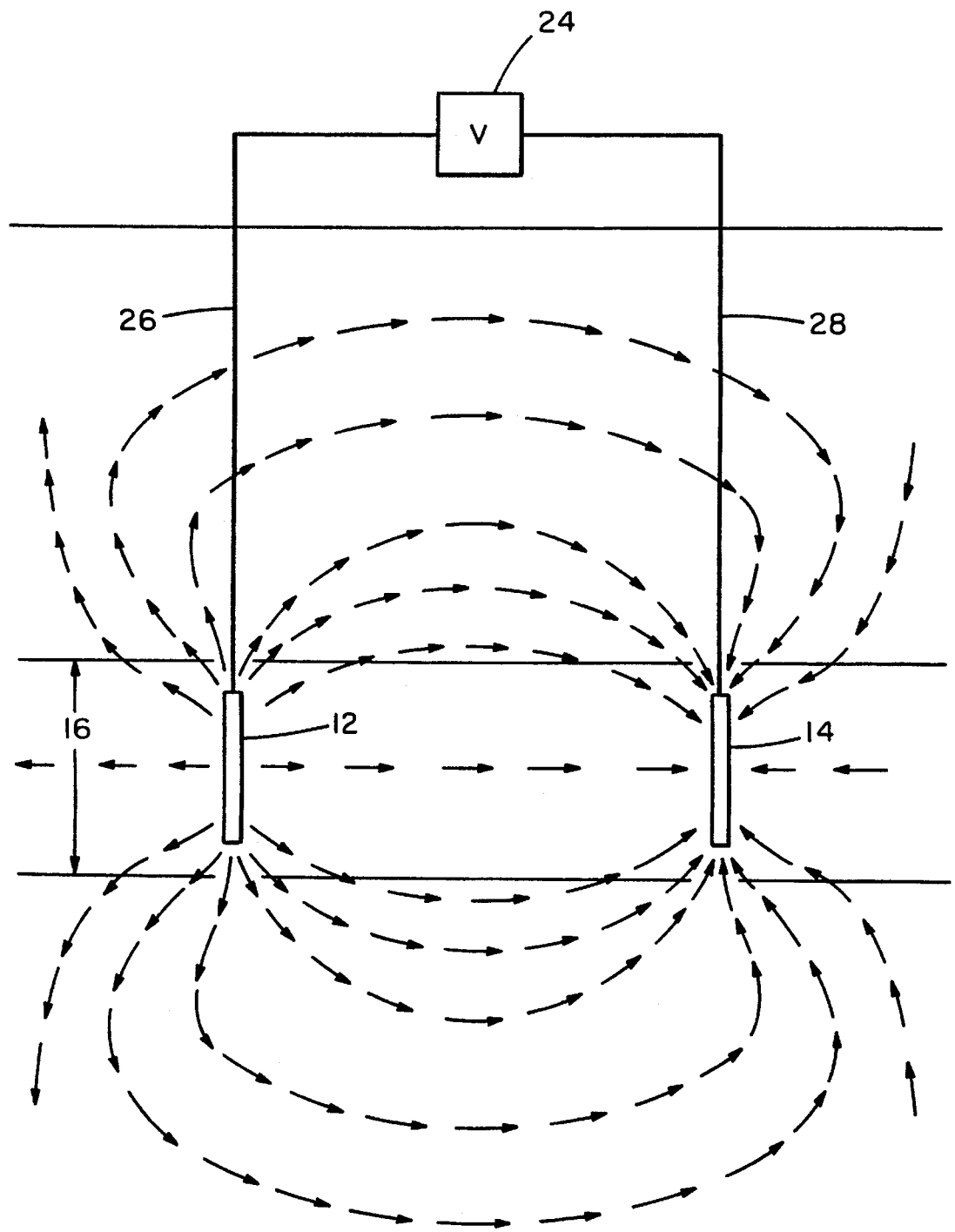
FIG. 3 is a vertical sectional view of current flow pathways around the electrodes of the apparatus illustrated in FIG. 1, showing a more accurate rendition of the current flow pathways.

The correct current pathways for two adjacent but oppositely polarized electrodes, as illustrated in FIG. 1, are shown in FIG. 3. As before, a voltage source 24 supplies oppositely polarized potentials via insulated cables 26 and 28 to electrodes 12 and 14 which are embedded in the formation 16 to be heated. The current pathways illustrated in FIG. 3 arise because the entire length of each electrode is placed at the same potential and because like charges which collect on an electrode tend to repel each other. Such charges accumulate near the ends of the electrode. As a consequence, the charge density near the ends of the electrode is much greater than the charge density at the middle of the electrode. Since current density is proportional to charge density, more current enters and leaves the tips of the electrode rather than at the mid-point. The high density of current near the ends is one of the factors which causes the currents to bypass the desired formation 16 and to flow into the overburden and underburden which is of little interest.

Another feature which causes the underheating of the desired formation is the fact that the current tends to flow outwardly from each electrode radially and that the nearby heating effect is roughly inversely proportional to the square of the radial distance from each of the electrodes. As a consequence, the principal heating effect tends to be in the immediate vicinity of the electrode and little heating effect occurs beyond, unless the electrodes are closely spaced.

Figure 4:
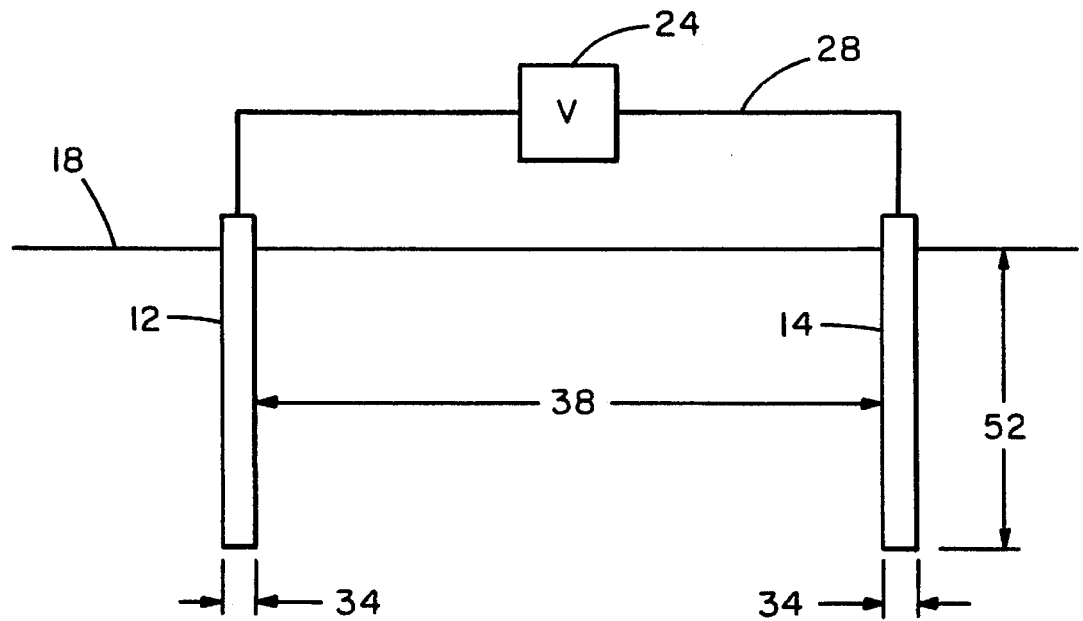
FIG. 4 is a vertical sectional view of an in situ ohmic heating apparatus having electrodes emplaced in contact with the soil from the surface downward.

FIG. 4 illustrates key geometric features of the two electrodes 12 and 14 emplaced so that they protrude from the surface 18, polarized oppositely by voltage source 24 connected to each electrode via insulated cables 26 and 28. The diameter 34, the length 52 of the electrode beneath the surface 18 and the spacing 38 are important factors. Consider the case first where the spacing between the electrodes is very large compared to the length 52 of the electrode beneath the surface. In this case the electrical resistance between each of the electrodes is controlled almost entirely by the characteristics of the soil in the immediate vicinity of the electrodes regardless the spacing, so long as it is large compared to the length 52. This occurs because of the divergent effects of the current as it leaves the electrodes, regardless of whether it leaves the electrode uniformly along its length or principally near the ends. This phenomenon of localized heating also limits the amount of power which can be applied to the electrode prior to the evaporation of all the moisture near the electrode, which radically increases the resistance of the soil, thereby terminating the ohmic heating effects between the electrodes. However, as the spacing 38 between the electrodes is reduced to something in the order of the length of the electrode 52, about 20–28% more current will flow principally between the electrodes rather than uniformly outward in a radial direction. As the spacing is further decreased such that only a very small distance 38 exists between the electrodes, more and more current will flow between the electrodes and a very little fraction of the total current will flow outwardly in a radial direction. Under such circumstances, a threshold where the adjacent electrodes exhibit significant proximity effects may be defined as that at which a 20–28% modification of the current flow occurs. This happens when the electrode spacing 38 is approximately equal to or less than the electrode length 52.

The diameter 34 of the electrode also influences the specific critical spacing in a small but sometimes significant way.

Figure 5:
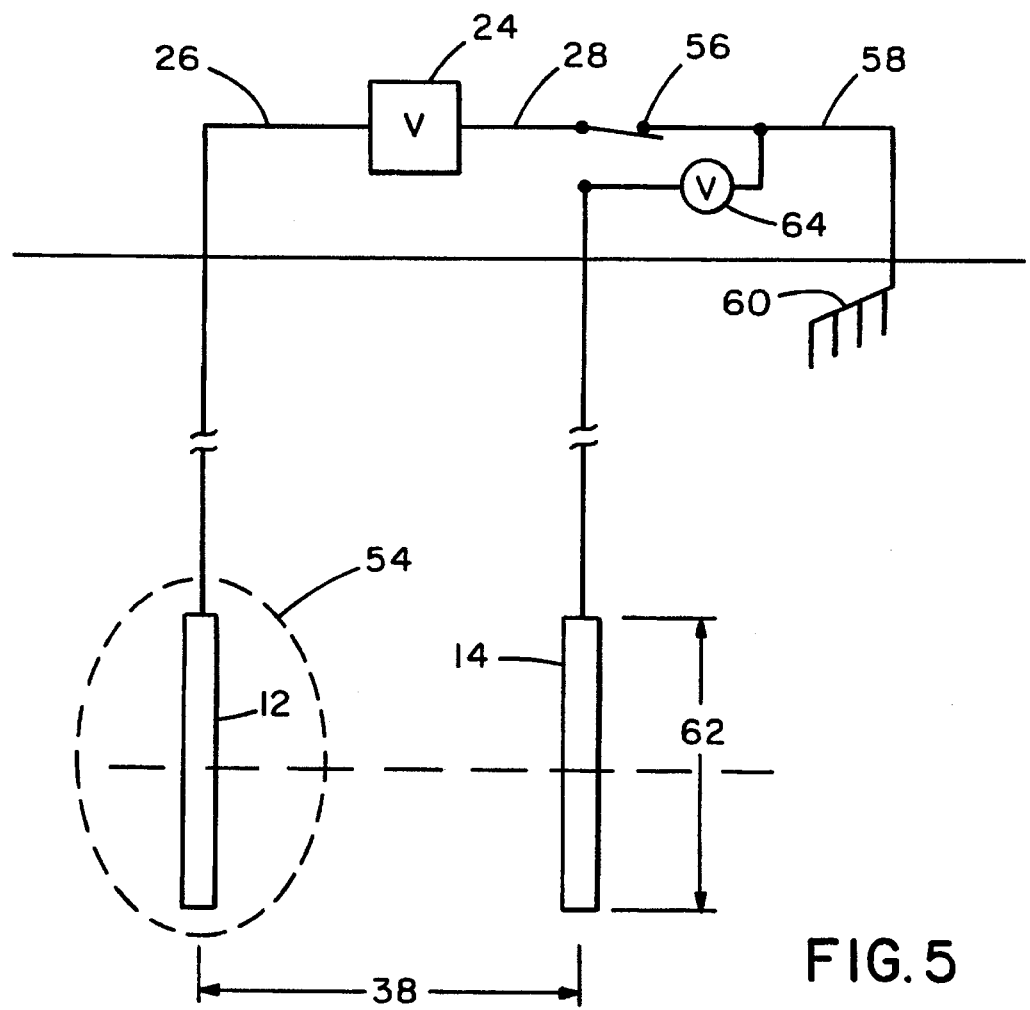
FIG. 5 is a vertical sectional view of an in situ ohmic heating apparatus having electrodes emplaced substantially underground.

In the case of deeply buried electrodes, as illustrated in FIG. 5, a similar set of circumstances can occur. The same spacing criteria apply, except that the length 62 of the entire electrode is taken into account, as opposed to the length under the earth's surface as shown in FIG. 4. In this case, the adjacent electrodes 12 and 14 are oppositely polarized via potentials supplied by source 24 via insulated cables 26 and 28. Also illustrated are the coordinate axes "X", the distance along the electrode axis and "Y", the distance along the perpendicular to the electrode axis, which will be used in the analysis below relating to optimizing the apparatus design. It can be shown that the equipotential curve 54 develops when the electrode 12 is placed at a potential relative to a distant "earth". This may be done according to the apparatus depicted in FIG. 5 by changing the position of the switch 56 to conduct current from the source 24 into insulated conductor 58 which leads to the grounding mat 60. This makes electrode 12 an isolated monopole. The grounding mat 60 is placed at a considerable distance from either electrode. In this case the equipotential line 54 can be approximated as an ellipse. The potential applied to electrode 12 can be shown analytically to induce a potential on electrode 14, which is not significant until the spacing 38 is equal to one-half the entire electrode length 62. Thus, the electrodes operate essentially independently of one another and have very little influence on each other until the spacing 38 between the electrodes is comparable to or smaller than half the length 62 of the deeply buried electrode.

As may best be seen in FIG. 5, the mutual effects between electrodes can be estimated by measuring with a high impedance voltmeter 64 the potential developed on an adjacent disconnected electrode as referenced to the remote ground 60 (in this case, electrode 14 with switch 56 connected to the remote ground 60, via cable 58) for a given current flowing into electrode 12. This induced potential can then be compared with the potential developed on electrode 12 for the same current flow for a formation resistivity of ρ.

The approximate induced potential, $V_i$, at a distance y in a horizontal plane perpendicular to the mid-point of electrode 12 (x=0) is:

$$V_i = \frac{\rho I}{2\pi L} \ln \left( \frac{\sqrt{y^2 + \left(\frac{L}{2}\right)^2} + \left(\frac{L}{2}\right)}{\sqrt{y^2 + \left(\frac{L}{2}\right)^2} - \left(\frac{L}{2}\right)} \right)$$

where I is the current and L is the length of the electrode. The potential of electrode 12 (or 14 if it is the same as electrode 12) for the same I and with the radius of the electrode designated α becomes:

$$V_{12} = \frac{\rho I}{2\pi L} \left[ \ln\left(\frac{2L}{\alpha}\right) - 1 \right]$$

For very thin electrodes, the ratio of $V_i/V_{12}$ (or $V_i/V_{14}$) is in the order of 0.3 for y≅L/2 and plausible values for 2 L/α. This shows that significant modifications of the radial current flow begins to occur where the electrode separation is equal to or less than one-half the electrode length.

Figure 6:
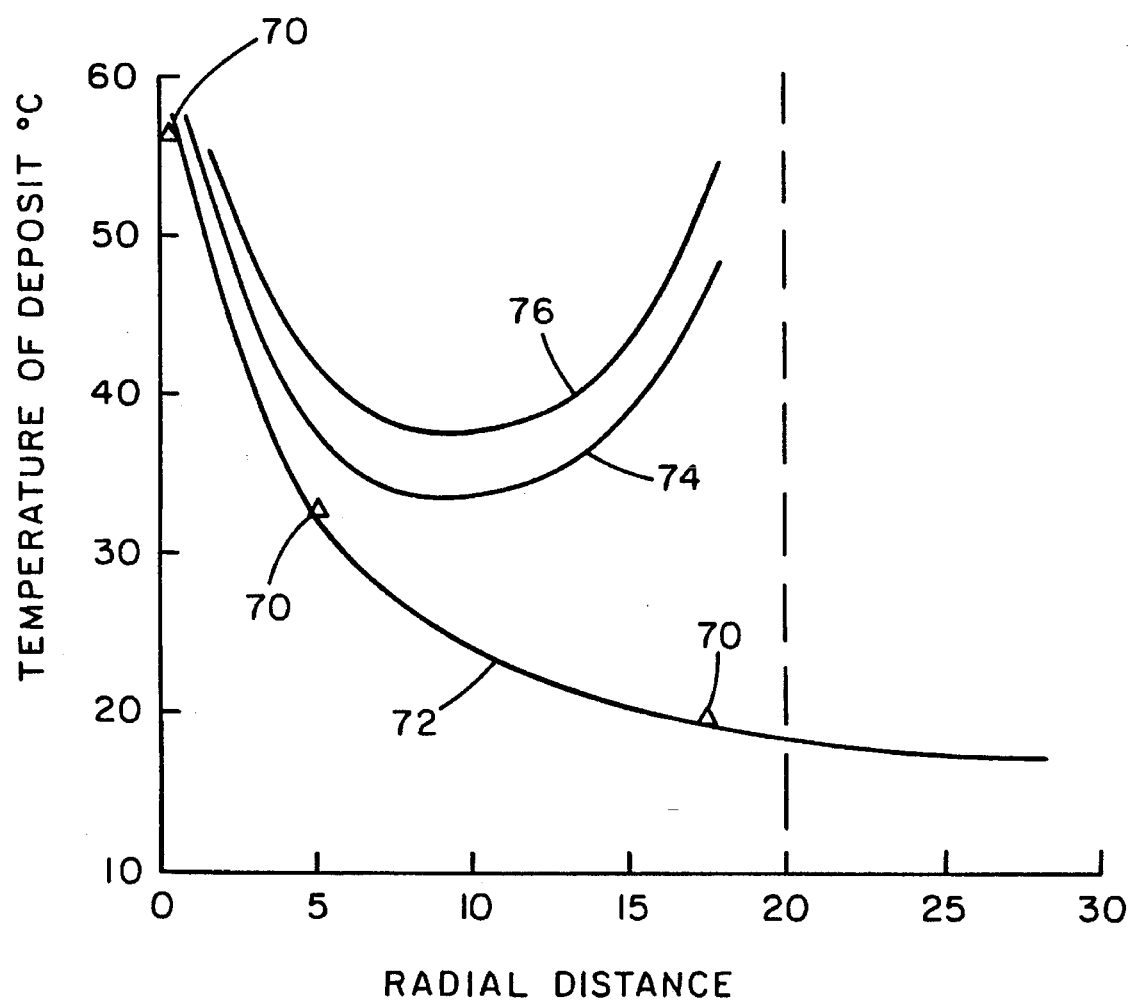
FIG. 6 is a graph of an estimated temperature profile between two 40 foot long, 6 inch diameter electrodes of an in situ ohmic heating apparatus after 20 days of heating, based on actual measurements around one 40 foot long, 6 inch diameter electrode.

FIG. 6 shows temperature measurements made near a cylindrical monopole in a radial direction at depth in a heavy-oil formation. The electrode length was approximately 40 feet with a diameter of about 6 inches. The temperature was monitored on a horizontal plane through the mid-point of this electrode and was measured on the electrode and at distances of 4.5 feet and 16 feet away from the electrode, represented by symbols 70. The temperature heating profile 72 at the end of 20 days is shown, which includes the effects of some thermal diffusion as well. If an oppositely polarized electrode is placed at a distance of 20 feet, a combined temperature rise for twice the power input, not taking into account mutual effects between electrodes, is estimated by curve 74. Curve 76 approximates the temperature profile where mutual effects between the electrodes are considered. The temperature profile is highly non-uniform and would result in different vapor pressures of contaminants throughout the formation. Assuming that tests were conducted using vacuum extraction technology assisted by electrical heating, processing time would be controlled by the minimum formation temperature of about 40° C. and energy would be wasted in excess heat near the electrodes.

Under the circumstances, as illustrated in FIG. 6, the heating pattern at the mid-point between the electrodes could be improved if the current densities near the tips of the electrodes were suppressed in favor of enhancing the current flow at the mid-point of the electrodes.

Figure 7:
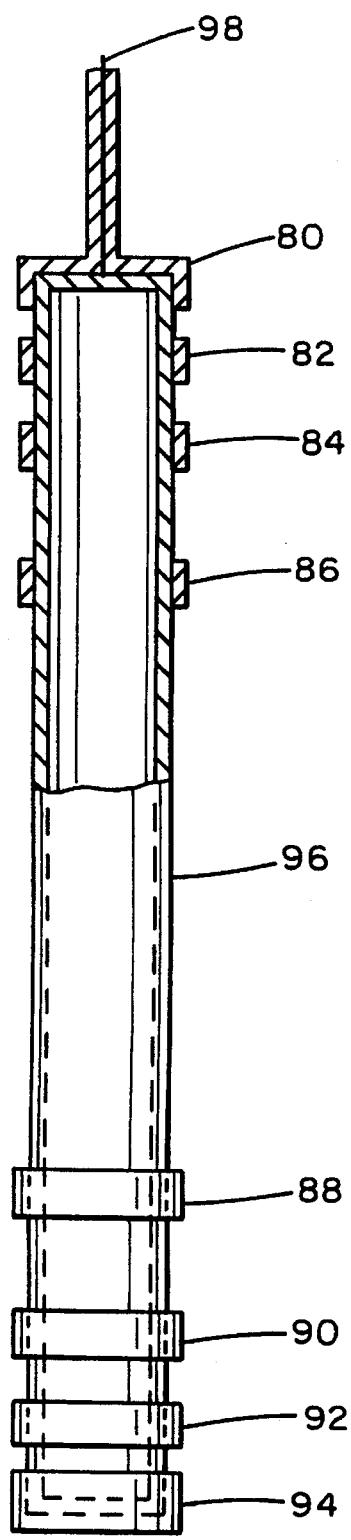
FIG. 7 is a partially sectional view of an electrode of one embodiment of the present invention, having spatially distributed sections of insulation to mitigate the high current flow concentrations near the ends of the electrode.

FIG. 7 illustrates one method to mitigate this "endfire" phenomena by adding spatially distributed insulation along the electrode. The insulation would be distributed such that conduction near the ends of the electrodes would be reduced by means of the insulation. As shown in FIG. 7, the insulation is in the form of annular segments 80, 82, 84, 86, 88, 90, 92, and 94 placed over the steel electrode 96. Naked segments decrease in length closer to the ends of the electrode. The uppermost annular segment 80 continuously covers the end of the electrode and the cable 98.

The arrangement shown in FIG. 7 is particularly useful at depth, where evaporation of water near the exposed conductor near the end would be suppressed by the increased pressure created by liquids in layers above the electrode. An electrode of this design may be used in conjunction with other nearby electrodes or may be used as a monopole to heat locally around the wellbore in a heavy-oil formation.

Further problems arise if high heating rates are needed. Such high heating rates can rapidly evaporate the moisture near the electrodes.

In "Earth Conduction Effects and Transmission Systems," Chapter 3, E. D. Sunde describes a method of estimating the maximum temperature of an electrode based on the resistance of the electrode, starting with the equation:

$$T = cV^2/2$$

where T is the temperature in celsius degrees, c is the ratio of the electrical to thermal conductivity and is experimentally found to be $10^{-2}$ up to $3 \times 10^{-2}$, and V is the voltage applied to electrode 12 as referenced to a remote ground. The spreading resistance R for a deeply buried electrode of length n is approximated by:

$$R = \frac{\rho}{2\pi L} \left[ \ln\left(\frac{2L}{\alpha}\right) - 1 \right] \cong \frac{\rho}{2\pi L} \ln\left(\frac{0.74L}{\alpha}\right)$$

and for a shallow electrode exposed from the surface downward, of length L/2:

$$R = \frac{\rho}{2\pi(L/2)} \left[ \ln\left(\frac{2L}{\alpha}\right) - 1 \right]$$

where $\rho$ is the formation resistivity near the electrode, $\alpha$ is the radius of the electrode, with $\alpha \ll L$.

Since:

$$P = V^2/R$$

$$V^2 = PR$$

where P is the apparent power absorbed by the electrode, the temperature can be solved for:

$$T = (\frac{1}{2})c\, PR.$$

The maximum power which can be absorbed per electrode installed from the surface down becomes as follows for T<100° C.:

$$100°\ C. > T = (\frac{1}{2})cPR$$

$$P_{max} = 200(cR)^{-1}$$

$$P_{max} = 20\ \text{kilowatts}/R\ \text{ohms}$$

This last equation thus provides a design limit as to the maximum average power which can be absorbed in the soil adjacent to the electrode over a period of at least several months. The electrode spreading resistance R can be developed experimentally by determining one-half the ratio of the applied voltage divided by the observed current between two similar adjacent electrodes. If water is injected near the electrodes, the electrode resistance drops and more power can be applied to the electrode. If oppositely polarized electrodes are moved closer together, the value of the measured R will decrease, thereby indicating the ability to absorb more power. Alternatively, the electrode spreading resistance can be calculated directly from the equations above. For either method, the spreading resistance should be decreased by about 50% if the value of R or $\rho$ were measured at the initial ambient temperature of the formation, since $\rho$ decreases about 40% as the temperature is increased from 20° C. to 80° C.

A typical formation may have a resistivity of 100 ohm/m. For an electrode length of 40 meters and diameter of two-tenths of a meter, the maximum power input to avoid the vaporization point of water near the electrode would be approximately 7 to 11 kilowatts, based on the above relationships. When the water immediately surrounding the electrode is vaporized, the conductivity is reduced and this tends to terminate the heating process.

The method of making and maintaining ionic or ohmic contact between the electrodes and soil is important. In the general case for the RF method, bore holes are drilled and electrodes are installed. In order to insert each electrode, the electrode diameter must be smaller than the diameter of the bore hole. As a consequence, an air gap exists between the electrode and the deposit except perhaps at a point of leaning contact. If high radio frequencies are used, the small contact area has an insignificant effect since most of the currents pass into the deposit via capacitive coupling, that is, they are displacement currents.

On the other hand, if 60 Hz ohmic heating is used, displacement currents are generally small in comparison with conduction currents. Conduction currents can only flow into the deposit at the point of contact between the electrode and the deposit. Since the contact point is limited in extent, a very high "contact resistance" exists, which is much larger than the resistance component of the deposit. When this occurs, all the heating takes place at the point of contact. This soon heats the deposit at the contact point and evaporates the water which provides the conductive link. Upon almost complete evaporation, the heating process is nearly suppressed. Thus it is important that total contact between the electrode and deposit be made and maintained.

There are several possibilities for making total ionic contact. A free-flowing aqueous conducting solution might be introduced into the air gap. However, tests have shown that this electrolyte solution quickly migrates into the more permeable layers of the deposit. This is undesirable and adds to heating difficulties. Moreover, it requires a constant supply of electrolyte solution.

Alternative materials to use in forming contact between electrodes and the deposit fall into four categories:

1) Permeable and conductive
2) Impermeable and conductive
3) Permeable and nonconductive
4) Impermeable and nonconductive Beyond using an electrolyte, means of realizing permeable, conductive contacts are not immediately evident in the prior art. According to the present invention, however, such a means may be formed by compressing a long strip of cellulose sponge when moist, and then drying the sponge in the compressed form. The electrode is wrapped in a strip of compressed sponge and then inserted into the bore hole. Electrolyte is added to the bore hole, causing the sponge to swell, thus making substantially complete contact between the electrode and the deposit. Other types of compressible conducting media may be used, such as conductive fibers similar to those used in a pot scrubbing pad, except that the pad would be in the form of a long ribbon which could be wound around the electrode.

In many types of deposits, it may be desirable to employ an impermeable yet conductive contact medium between the electrode and the deposit. In such cases, a polymer may be added to the electrolyte such that its viscosity becomes very large and thus prevents rapid migration of the electrolyte in the deposit. Alternatively, a variety of gels or gelatins may be added to the electrolyte to achieve the same effect. An example of such a gel is Permasorb.

A suitable solution for the above purpose is a clay bentonite slurry formed from dry clay powder and calcium chloride electrolyte. This slurry does not flow into the deposit and also forms a nearly impenetrable or impermeable seal. It has an electrical conductivity significantly greater than that generally found in soil formations. Mixtures of clay with a solution fully saturated with calcium chloride or similar salts have proven satisfactory.

A permeable yet nonconductive interface between the bore hole and the electrode may be required to isolate a portion of an electrode, yet allow injection of a fluid such as a gas. Standard oil well slotted liners or gravel packs may be used in these cases. Dry sand particles also serve the same function.

An impermeable and nonconductive interface may be required to electrically isolate different segments of an electrode. In this case, a segment of the electrode is simply coated with an electrically insulating, low-conductivity grout.

Thus, two major problems exist with widely dispersed electrode arrays, namely, A) the power which can be applied to any given electrode is limited, and B) current has a propensity to flow in a vertical direction rather than in the desired horizontal direction between two isolated, vertically emplaced electrodes.

There are several methods which can be used to mitigate the aforementioned problems. One would be to limit the power applied to the electrode such that the water surrounding the electrode is not evaporated. Another method would be to inject water into the electrode and thence into the formation. This has several potentially beneficial effects. First, it can cool the soil immediately surrounding the electrode, thereby delaying the onset of heating termination due to water vaporization and, second, if the water is saline, it can increase the effective diameter of the electrode. However, assuming that the conductivity of fluids injected is sufficiently high to reduce the resistivity of the soil by an order of magnitude below the resistivity of the unaffected soil, the beneficial effect is not particularly great unless soil at large distances from the electrode can be saturated with the high conductivity fluids. For example, injecting sufficient fluids around a 0.20 meter diameter electrode out to two meters would allow a power increase from 7 kW to 13 kW without resulting in significant water vaporization. If the high conductivity zone was extended out to a 10 meters, the amount of applied power could be increased to about 30 kW. However, completely saturating the formation with saline water would decrease the resistivity by an order of magnitude or so and thereby increase the allowable power per electrode from 7 kW to 70 kW. Yet, this may be undesirable, since the water would fill the void spaces and thereby block the flow of air needed to sweep out the vapors.

Unfortunately, the injection of saline water, while mitigating the average power limitation of each electrode, does not solve the spatial power deposition problem associated with the upward or downward flow of current around each vertical electrode, when a horizontal current flow would be desired. Furthermore, in many soils the problem of achieving uniform fluid injection around an electrode that is 20 to 40 meters long is extremely difficult. The reason for this is that the permeability of soils to fluid flow varies with depth. The soils themselves may exhibit fluid flow permeabilities very high near the surface or in sandy soil. On the other hand, where the electrode passes through a tight soil such as clay, very little fluid can be injected. Where the electrode passes through a permeable aquifer, even though perched, most of the saline fluids injected would pass into the aquifer thereby contaminating the groundwater system. Thus, some control of the fluid injection would be required in most situations in order to take advantage of the fluid injection benefits. Furthermore, injection of liquids could damage the ionic contact between the electrode and the formation.

According to the methods of the present invention, there are four possible techniques for mitigating the aforementioned effects: 1) controlling the resistivity distribution around or between the electrodes by means of controlled fluid injection or withdrawal; 2) controlling the charge distribution along the electrode to help suppress the vertical components of the current flow between the electrodes; 3) controlling the geometric spacing between the electrodes in a way such that significant mutual coupling exists between adjacent electrodes which will induce the current to flow not vertically but along a more direct path between the electrodes; and 4) providing ionic contact between the electrode and formation which is either permeable or impermeable to fluid flow and yet resistant to damage by injection of water.

Figure 8:
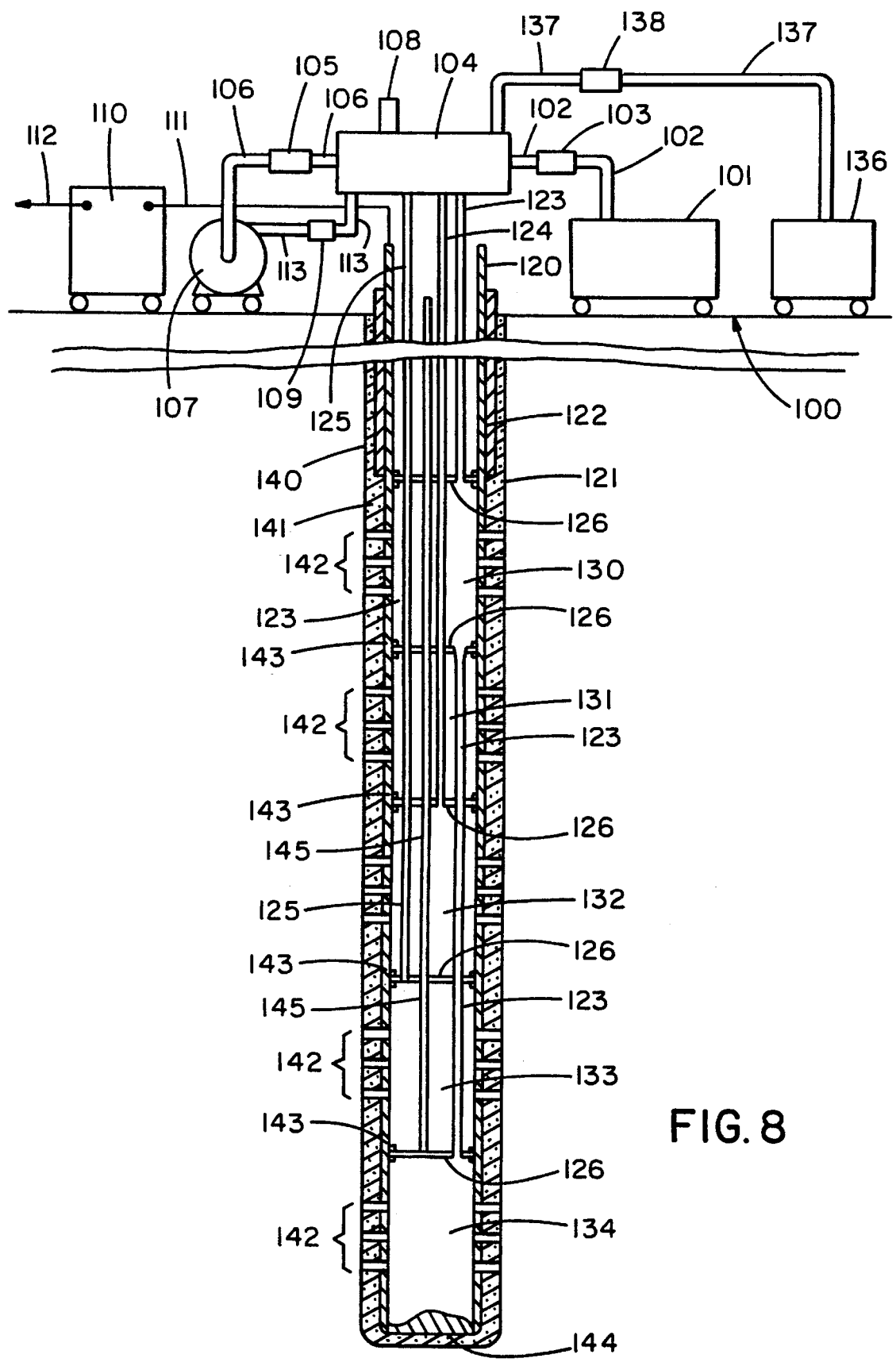
FIG. 8 is a sectional view of an electrode of another embodiment of the present invention, having means for selectively controlling the injection or withdrawal of fluids at multiple locations along the electrode to control current distribution.

FIG. 8 illustrates a method according to the present invention of controlling the conductivity distribution around the electrode in a reasonably permeable formation. The electrode is provided with a series of plenums within the electrode itself which are connected to the formation via perforations made in the electrode. Connections between the formation and each of the plenums are made via tubing. To prevent the deleterious effects of overheating and to control the spatial resistivity distribution of the formation next to the electrode, water may be injected into the various plenums and thence into the formation. The amount of water and its salinity can be controlled so as to minimize the outward flow of vertical current and maximize current flow in the horizontal direction. Another benefit of the plenums is that if the highly permeable zone is encountered, water injection can be withheld from that particular highly permeable zone, such as an aquifer. The function of the plenums is also to allow injection or withdrawal of air in selected areas surrounding the electrode. For example, if necessary to suppress the outward and downward flow of current from the tips, air can be withdrawn from these portions thereby drying the soil next to the tips of the electrode.

Specifically, referring to FIG. 8, mounted on the earth's surface 100 are an effluent treatment system 101, a vacuum/blower 107, a power supply 110, and a reservoir of saline water 136. The bore hole 140 is drilled into the earth and drilling mud 141 is used to prevent sloughing of the soil into the bore hole. The steel casing 120 is then inserted with an open end 144 into the bore hole. The upper part of the casing is electrically insulated with insulation layer 122 as required to prevent heating of the upper layers of the earth. The casing is cemented in place by pumping a conducting grout 141 down the casing and around the open end 144 and up through the annular ring between the casing and the bore hole by conventional oil well completion methods. This provides an annular ring of conducting grout around the casing which in turn sets to a relatively high hardness. The portland cement grout 141 itself is rendered highly conductive by the addition of various salts such as calcium chloride, 18%-by-weight. Perforations 142 are formed where it is desired to inject or withdraw fluids.

Because of the expense associated with cementing the casing and perforating the cement, a preferable alternative is the use of a compressed, dry, permeable cellulose sponge wrapped around the electrode prior to insertion into the bore hole. After the wrapped electrode is inserted in the bore hole, water or a saline solution is injected into the bore hole, causing the sponge to swell, thereby achieving substantial contact between the electrode and the soil.

After the ionic contact between the electrode and soil has been made, the fluids within the bore hole are withdrawn and various plenums are installed by inserting a horizontal plenum section string on a structural rod 145. Attached to this rod are horizontal plenum sections 126, each of which is provided with a plenum seal 143. These then form plenums 130, 131, 132, 133 and 134 when inserted into the casing. Each of the plenum sections are connected to the manifold 104 via separate ducts, duct 123 for plenums 130 and 134, duct 125 for plenums 131 and 133, and duct 124 for plenum 132.

The power source 110 energizes the electrode via an insulated conductor 111 which is attached to the casing. This potential is applied to the casing via lead 112 which is attached to a similar electrode nearby or at some distance away to a remote low resistance ground.

The effluent treatment system 101 is connected by a duct 102 to the manifold 104. This duct is electrically isolated by a non-conducting duct section 103 from the manifold 104 and earth 100.

Also attached to the manifold is the vacuum/blower combination apparatus 107. This is attached to the manifold 104 via ducts 106 or 113 which contain electrical isolation sections 105 and 109, respectively. The manifold 104 contains the necessary duct work and valves such that the water can be injected into the various plenums via duct 137, and electrical isolation section 138, and the water reservoir 136. The manifold also contains the various valves which allow air to be injected into the various plenums 130, 131, 132, 133 and 134 via an air inlet 108 to the manifold. The manifold directs the air into the suction side of the blower 107 via ducts 106 and directs the pressurized output via duct 113 back into the plenum. Alternatively, it can withdraw air by adjusting valves in the manifold 104 by connecting the appropriate ducts to the air intake portion of the blower via duct 106.

Figure 9:
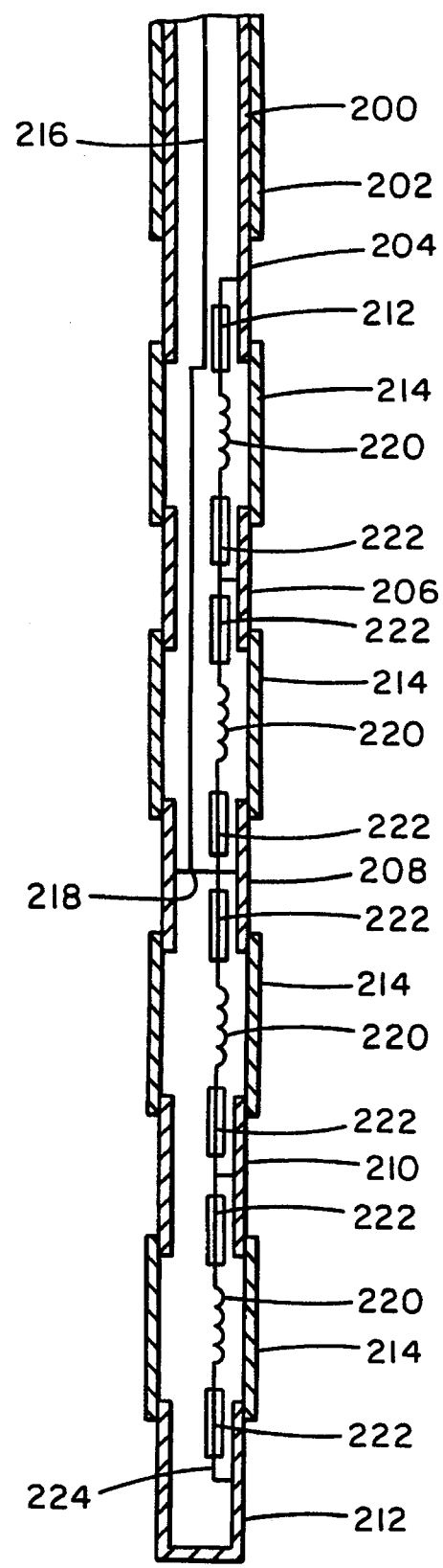
FIG. 9 is a sectional view of an electrode of yet another embodiment of the present invention, having means for selectively controlling the excitation potential in multiple segments along the electrode to control current distribution.

Alternatively, in another embodiment of the invention, the upward and downward flow of electric current from the ends of the electrode can be controlled by a technique as illustrated in FIG. 9. In this embodiment, the electrode is segmented by multiple insulators placed between the various conducting elements of the electrode. Each conducting element is supplied with power by a separate cable, the potential of each of which is independently controllable to optimize the current flow pattern. Preferably, by the arrangement shown in FIG. 9, each electrode segment is energized to a specific potential designed to suppress the endfire current distributions. This is done by placing the segments of the electrode at the middle of the electrode a higher potential with respect to earth than the electrodes near the end.

Practically, this may be done as illustrated in FIG. 9, wherein the uppermost portion of the casing 200 is insulated from the upper portion of the formation by insulator 202. Exposed elements 204, 206, 208, 210 and 212 are mutually isolated by non-conductive plastic annular rings 214. Power is supplied to each of the annular conducting electrode elements 204, 206, 208, 210 and 212 via an insulated cable 216 which is energized from a source on the surface similar to that shown in FIG. 8. Power flows directly down cable 216 to the electrode segment 208 to which the energized portion of the cable is attached at point 218. The power then flows via choke inductors 220 through insulated cables 222 to the annular rings immediately above and below the central annular ring 208. The electrical connection is made at points 224 to these adjacent electrode segments. Since the current flows unimpeded from cable 216 directly to ring 208, this ring will have the greatest potential with respect to earth. If very low frequencies are employed, the inductive drop will be very low as current flows from ring electrode element 208 to the electrode elements above and below it through inductors 220, and thus all electrode segments are energized with about the same potential. If it is desired to suppress the end effects, then the frequency of the excitation can be increased such that inductors 220 begin to exhibit considerable inductive reactance. This causes the current to the adjacent electrode segments to be reduced, thereby reducing their potential, the potential at the end segments being reduced the most. By means of controlling the frequency, the amount of charge distribution on the electrode can be altered to suit various required conditions during the heating procedure.

Assuming that a vertical pair of electrodes similar to that shown in FIG. 9 are placed within the preferred spacing, the distributed potential along each of the oppositely polarized electrodes is such that the center portions are at a higher potential than those near the ends. This causes a substantial decrease in currents flowing between the extreme ends of each of the vertical electrodes, thereby enhancing the mid-electrode currents and more efficiently heating the central region between the electrodes. Highly localized heating effects near the extreme ends of the electrodes are partially suppressed.

This strategy may be useful when the formation is tight and where evaporation of the moisture is suppressed until the boiling point of water is reached. In other formations which are permeable to gas, the excess heating effects near the ends will dry out the moisture, thereby increasing the resistivity of the soil near the tips. This may have the same effect as reducing the potential of the electrode segments near each of the tips, as shown in FIG. 9. Adding insulation segments near the ends, as shown in FIG. 8, further controls the heating of the horizontal layers of the soil midway between the ends of the electrode. By selectively injecting water into the mid-portion of the formation via the design shown in FIG. 8, the current pathway can be further optimized. This also tends to direct or focus the current flow into a horizontal pattern between pairs of electrodes, especially if the permeability distribution of the soil is layered such that the liquid flow is between electrodes.

Figure 10:
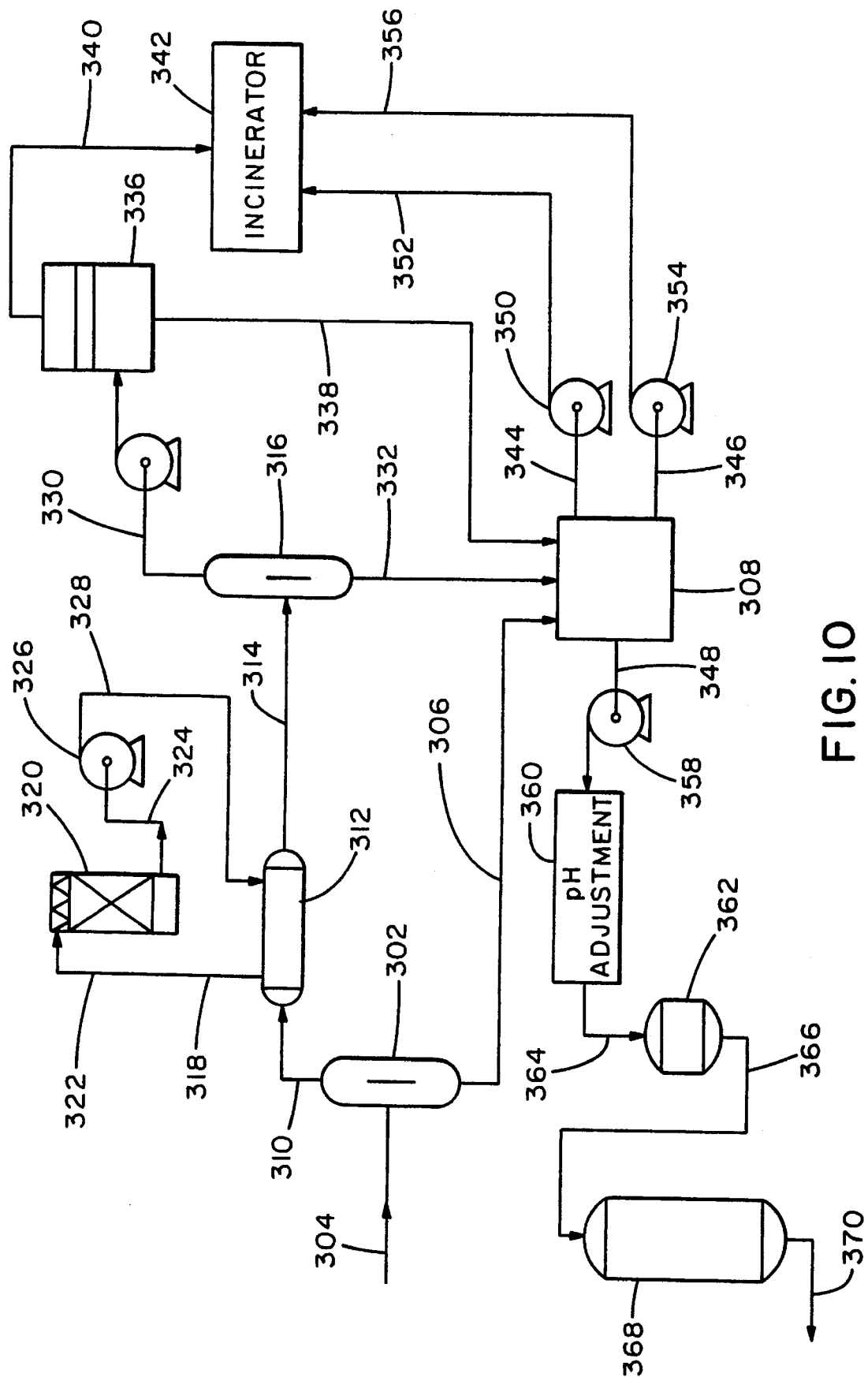
FIG. 10 is a diagram of a vapor treatment subsystem for use in the various embodiments of the present invention.

Turning now to FIG. 10, a vapor collection and disposal system 300 is shown for use with the various embodiments of the present invention. A gas-liquid separator 302 is connected to the line 304 and receives the fluid stream therefrom. Separated liquids are fed via a line 306 to a liquid-liquid separator 308. Separated gases are fed via a line 310 to a condenser-cooler 312 where heat is removed from the fluid stream, allowing some of the vapors to condense. The cooled vapors are output, along with the liquid, via a line 314 to a gas-liquid separator 316. In order to ensure adequate cooling, a cooling loop 318 is provided having a cooling tower 320 connected to an input line 322 from the condenser-cooler 312. The cooling tower transfers heat from the water stream to the atmosphere, and cooled water is fed from the cooling tower through a line 324 to a pump 326 and thence through a line 328 to the condenser-cooler 312.

The gas-liquid separator 316 has an output gas line 330 and a liquid line 332 connected thereto. The gas line communicates with a fan 334, the output of which is connected to a demister 336. The line 332 supplies liquid to the liquid-liquid separator 308 as does an output line 338 from the demister 336. Gases from the demister 336 are fed via a line 340 to a catalytic incinerator 342 used for non-chlorinated contaminant. When chlorinated contaminant is to be treated, a chiller and associated carbon bed absorber are substituted for the catalytic incinerator 342. The liquid-liquid separator 308 has a light organic phase output line 344, a heavy organic phase output line 346, and a water output line 348 connected thereto. A light organic phase pump 350 feeds the light organic phase material from the line 344 through a light organic phase line 352 to the incinerator 342, delivering light organic waste compounds, such as hexane and heptane, to the incinerator. A heavy organic phase pump 354 feeds material from the line 346 through a heavy organic phase line 356 to the incinerator 342 for feeding heavier organic compounds such as kerosene recovered from the site contaminated region to the incinerator where they are oxidized. Water from the contaminated region is fed by a line 348 to a pump 358 which delivers the water to a pH adjuster 360 for neutralizing any acidity in the water. The water is then filtered by a pressure filter 362 connected to a line 364 from the pH adjuster 360. An output line 366 from the pressure filter 362 supplies pH 7.0 filtered water to a carbon bed absorber 368 which removes any remaining contaminants filtered water to generate a treated water stream in an output line 370 for use in other portions of the equipment.

Figure 11:
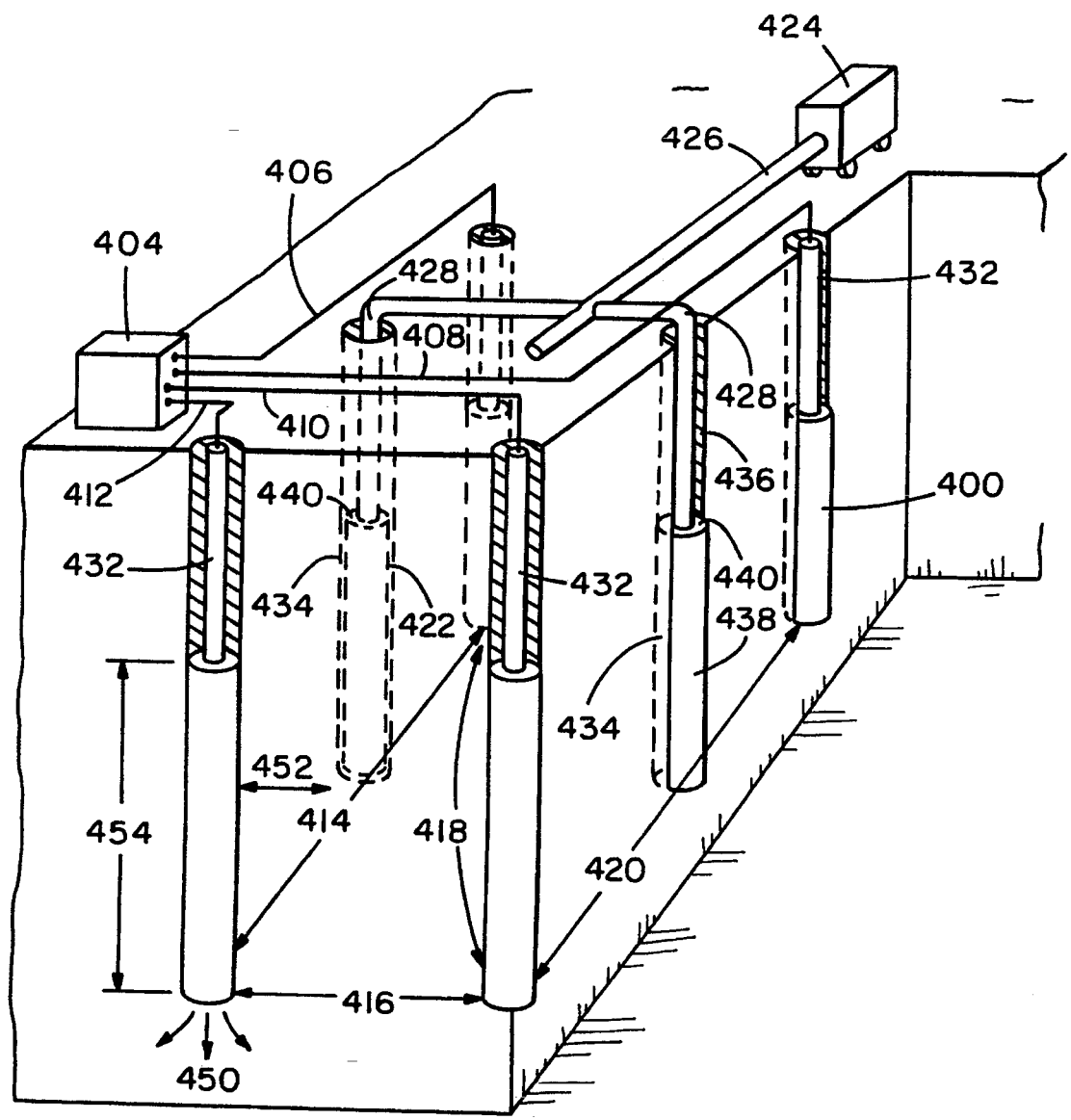
FIG. 11 is a sectional perspective of a complete in situ ohmic heating apparatus according to the present invention.

FIG. 11 shows a multiple electrode array according to another embodiment of the present invention. Electrodes 400 are buried in a formation 402, and are energized by a 60 Hz cycle source 404 via insulated cables 406, 408, 410 and 412, as appropriate for the needs of the heating program. These electrodes are separated by specified distances 414, 416, 418 and 420 as required to obtain the required heating pattern in terms of the amount of power available for each electrode. In this embodiment, heated vapors are withdrawn via vapor collection assemblies 422 whereby the heated vapors are carried to a vapor treatment system 424. All ducts 426 and 428 associated with the vapor collection system are heat traced, including those 428 below the surface of the earth.

To install the electrodes, bore holes 430 are drilled and a conducting clay slurry 432 is used to fill the bore hole around each electrode and cable. The conducting clay slurry may be formed from a mixture of bentonire, calcium chloride and water for installation of any electrodes depicted in FIGS. 4, 5, 7 and 9. In the case of the electrode shown in FIG. 8, a cellulose sponge is used wherein a calcium chloride salt is added to the water which is used to cause the sponge to swell. In the case of the air injection or extraction wells 434, similar bore holes 436 are formed. Slotted liners 438 are formed from plastic tubes with small (10 to 50 mil) slots cut into the walls. These liners are then inserted into bore holes 436. Sand grains with diameters comparable to and larger than the slot's width are then poured into the annulus between the slotted liner 438 and the bore hole 436. A clay slurry 432 is poured into the annulus between the duct 428, the bore hole wall, and a top cap 440.

In heating the soil to less than 100° C., low frequencies may be used wherein the conduction currents dominate and the displacement currents are largely negligible. This limits the frequency of operation to below several hundred kilohertz and, preferably to 60 Hz, or to a frequency in the range that is otherwise convenient and economical to apply. The design of the electrode 400 may be similar to any embodiment as shown in FIGS. 3, 4, 7, 8 and 9, depending on requirements. The spacing between the electrodes is of crucial significance to prevent the vertical current outflow from the ends of the electrodes.

The vertical current outflows are shown by arrows 450. Arrows 452 depict the desired horizontal current flow sought at the midpoints of the electrodes. If the spacing between the electrodes, as illustrated by 414, 416, 418 and 420, is large compared to the half-length of each electrode 400, the heating effects around each electrode occur largely independently of each other and are only constrained by the conductivity and temperature profile in the immediate vicinity of each electrode. For example, when the spacing 414, 416, 418 or 420 between adjacent electrodes is large compared to the length 454 of the electrode 400, the impedance of an electrode pair, with respect to each other, is equal to twice the spreading resistance of the electrodes and will remain the same no matter what the separation of the electrodes are, as long as the separation is large compared to the half-length of the electrodes. As the electrodes are brought more closer to each other, the current distributions on the electrodes will change owing to the increasingly greater value of mutual impedance between the electrodes.

This mutual impedance causes the current distributions on the electrodes to change, so that undesirable vertical current is diminished and desirable horizontal current increases. The shift in current distribution occurs when the mutual impedance becomes significant. The mutual impedance becomes significant when one-half of the length 454 divided by the electrode separation 414 is greater than 0.75. The preferred spacing for moderate heating and temperature variations occurs when the ratio of one-half of the length of the electrodes to the spacing 414 is on the order of 1, and more particularly when the ratio is equal to or greater than 1.1 for higher temperature and more uniform heating, where some water evaporates. Alternatively, this may be stated as saying the preferred spacing for deeply buried electrodes is at most 0.45 times the length of the electrodes. If the electrodes are not deeply emplaced, but rather are emplaced from the surface downward, so that they are bound at the top by the surface of the earth, this bounding causes the signal applied to the electrodes to behave as though it emanates from an electrode twice as long, the other half of which is above the surface. Therefore, in this case, the preferred spacing between electrodes is at most 0.90 times the length of the electrodes.

With the above electrode separations, the amount of unwanted current going into the formations of little interest can be suppressed. The amount of suppression which is required, of course, depends on a number of economic factors such as the cost of electrical power and the need to raise the temperature of the formation being processed more or less uniformly. However, the lowest temperature in a contaminated formation will determine the time needed to remove the least volatile component. Long processing times will increase costs and make inefficient use of capital equipment. On the other hand, to make the heating patterns more uniform, more closely spaced electrodes will be needed. However, the added cost of such electrodes, including installation, can be relatively small in comparison with the costs associated with prolonged on-site activities and excessive electrical power consumption.

In addition, the minimum number of electrodes must also be determined if substantial heating between the electrodes is required. The minimum number of electrodes is determined using the aforementioned results relating power to spreading resistance, and using the energy needed to raise the temperature of a cubic meter of the formation, as follows:

$$N \gg U\, E_{min}(Pt)^{-1}$$

where N is the number of equally spaced electrodes of equal length, U is the volume of the formation to be process in cubic meters, t is the processing time in hours, $E_{min}$ is the minimum energy in kilowatt-hours needed to heat the soil to a minimum temperature, and P is the total applied power in kilowatts.

Substituting, $$P_{max}=20 \text{ kilowatts}/R \text{ ohms}$$

into the above equation, the minimum number of electrodes required becomes:

$$N \gg U\, E_{min} R(20t)^{-1}$$

The value of R is best experimentally determined by measuring the resistance between two similar adjacent electrodes and dividing by two. The spreading resistance should also be determined under conditions of maximum water injection at the expected electrode operating temperature, if such is planned. Alternatively, the value of R can be estimated from the equations:

$$R = \frac{\rho}{2\pi L}\left[\ln\left(\frac{2L}{\alpha}\right)-1\right] \cong \frac{\rho}{2\pi L}\ln\left(\frac{0.74L}{\alpha}\right)$$

for deeply buried electrodes, and:

$$R = \frac{\rho}{2\pi(L/2)}\left[\ln\left(\frac{2L}{\alpha}\right)-1\right]$$

for electrodes emplaced at the surface. This estimated value of R should be corrected for the resistivity reduction caused by injection of saline water and for the decrease in the resistivity as the temperature of the material near the electrode increases. The resistivity decrease due to temperature can be determined as follows:

$$\rho(T)=\rho(T_0)[1+2.2\times10^{-2}(\Delta T)]^{-1}$$

Where $\rho(T)$ is the resistivity at the operating temperature T, $\rho(T_0)$ is the resistivity at formation temperature $T_0$, and $\Delta T$ is the increase in the temperature to the operating temperature T.

Alternatively, if water injection around the electrode is practical, the effect of injection of conducting water will be to increase the effective radius of the electrode and to cool the electrode. Typically for electrodes near the boiling point of water, significant porosity and permeability are created by the partial evaporation of the water. However, this artificially created permeable region is limited to the immediate vicinity of the electrodes during much of the heating cycle. Referring to FIG. 6, it may be seen that the regions where temperature-induced porosity and permeability have been created are limited to about a 1 to 2 meter radius around the electrode except for the final stages of the heating cycle. From the spreading resistance equations, it may be seen that an increase in the effective radius of the electrodes from 0.1 to 2 meters only reduces the value of R by a factor of 2.

Thus, the minimum value of R would be about one-third the values developed from the equations relative to the resistivity at formation temperatures and the actual radius of the electrode.

The minimum energy is determined by the minimum temperature rise in the formation. In the case of the example of FIG. 6, a 60° C. minimum temperature would require about a 20° C. rise and require at least 10 kWh/m³, assuming uniform heating without evaporation of water. The actual applied energy would be greater, since greater temperatures occur nearer the electrode and since energy may be wasted due to unwanted current flow pathways. Thus, at least 20 kWh/m³ would be needed on the average for a low temperature, largely nonevaporative heating, such as illustrated in FIG. 6. However, for optimum removal of contaminants, a reasonable processing time and more uniform heating and higher temperature are required.

To increase the temperature to approach 100° C., assuming a more uniform heating method, would require about 50 kWh/m³, again assuming little or no evaporation of water. However, in order to remove the lower vapor pressure hazardous components, even higher temperatures are desirable. Such higher temperatures, in combination with passing air through the formation, will evaporate some of the moisture thereby cooling the formation. The maximum energy required to heat to 100° C. a soil having 15%-by-weight moisture content and to fully evaporate all of the water therein would require about 200 kWh/m³.

For optimum decontamination purposes, higher temperatures and some removal of the moisture is highly desirable. For optimum removal of hazardous materials where the vacuum extraction method (VET) in some form is combined with the sparse electrode array (of equal length electrodes equally spaced), a minimum energy requirement of 75 kWh/m³ is a suitable value for determining the minimum number of electrodes, where about 2.5%-by-weight moisture is evaporated.

Figure 12:
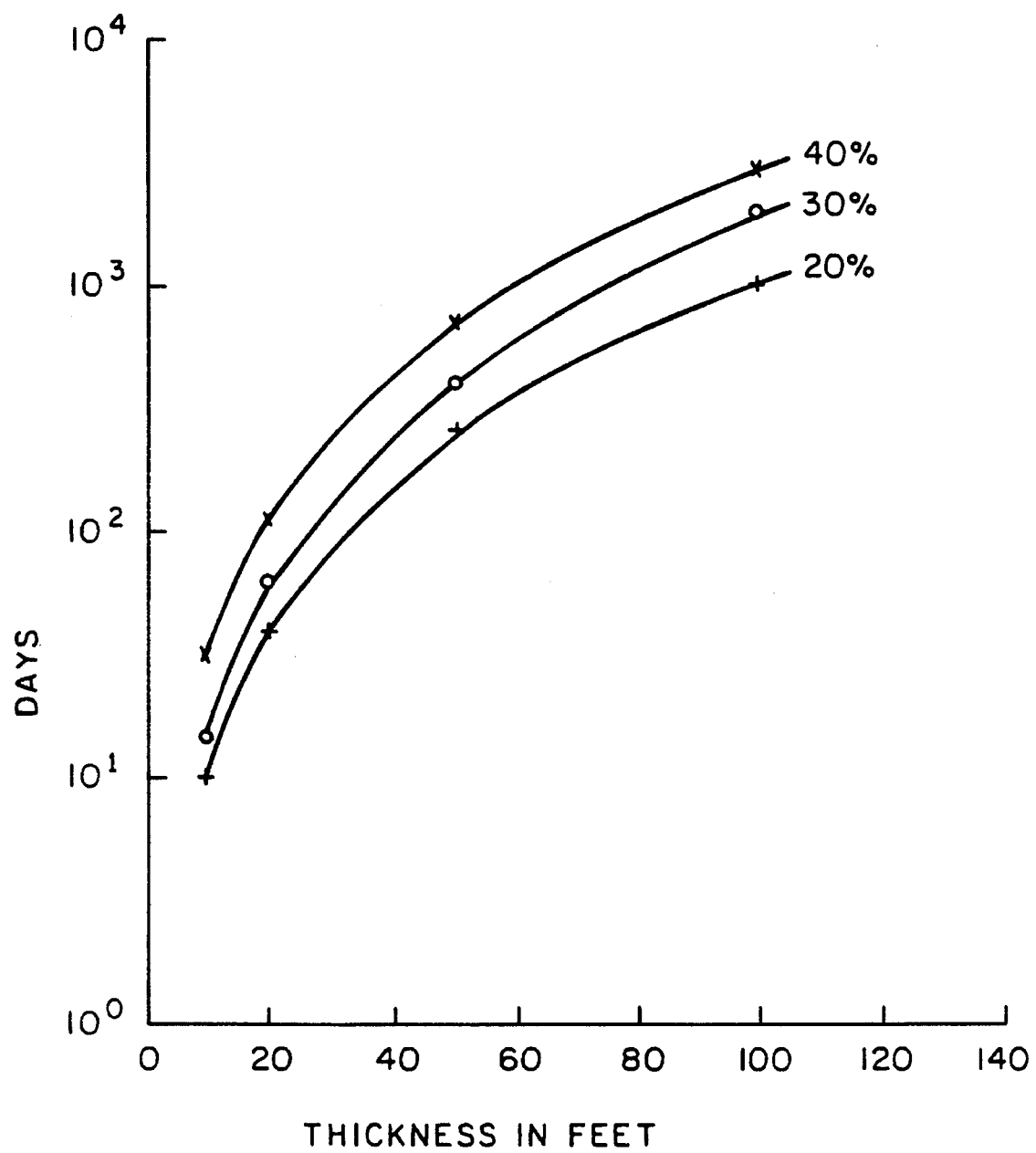
FIG. 12 is a graph of the percent of heat lost as a function of heating time and formation thickness in in situ subsurface formation heating.

The processing time t should be short enough that less than 15 to 30% of the applied energy thermally diffuses to formations of no interest. Such times are shown in FIG. 12. These times can be approximated for about a 15% loss, if the electrodes are emplaced at the surface and a thermally insulated vapor barrier is placed over the heated area, or for about a 30% loss, if the electrodes are emplaced well below the surface, as follows:

$$tmax<=0.5(h/2)^2[(3600)(24)c_1]^{-1}$$

where $t_{max}$ is the maximum allowable processing time in hours, h is the formation thickness in meters, and $c_1$ is the thermal diffusivity, typically $10^{-6}$ m²/s.

Simplifying:

$$t_{max}<1.5\, h^2 \text{ days}$$

$$t_{max}<36\, h^2 \text{ hours}$$

and substituting these results into the previous results for the minimum number of electrodes required yields:

$$N > U\, E_{min}\, R[(20)(36\, h^2)]^{-1}$$

Also substituting one-third the approximate value of R developed above:

$$N \gg U\, E_{min} \frac{\rho}{L} \left[ \ln \frac{0.74L}{\alpha} \right] [1.4 \times 10^4 h^2]^{-1}$$

For example, consider a 100×100 m² site with deeply buried contamination over a 10 m interval and for ρ=20, and ρ=200 Ω–m. For the higher temperature heating requiring some 2.5% water evaporation Min E≅75 kW/m³, and where L=10 m, a=0.1 m, h=10:

$$N \gg 460 \text{ electrodes for } \rho=200\ \Omega\text{–}m$$

$$N \gg 62 \text{ electrodes for } \rho=20\ \Omega\text{–}m$$

Note that the desired electrode spacing for moderate temperature rise and variations would be no more than 5 meters apart, which would require about 400 electrodes per 100×100 square meter site.

Note also that the optimum electrode spacing criteria for higher temperature and more uniform heating suggests electrodes be spaced no more than 4.54 m apart or 485 electrodes per 100×100 m² site.

While the description of the technology has focused on in situ removal of hazardous materials, the same methods and apparatus can be used to assist in the recovery of valuable minerals which have some thermally responsive property. For example, heating of heavy oil deposits will decrease the viscosity of the oil and thereby aid in its recovery. Native sulfur melts at 230° F., so that heating of deposits to temperatures above this level will liquify the sulfur and allow application of various in situ liquid recovery methods. Other thermally responsive minerals include gas hydrates and paraffin-prone light oil.

While discussion of the invention has focused on apparatus having vertically emplaced electrodes, it lies within the scope of the invention to use horizontally emplaced electrodes in the various embodiments. When using horizontally emplaced electrodes, the spacing between electrodes should be at most 0.45 times the length of the electrodes, since there is no signal-bounding influence such as the surface of the earth at the ends of the electrodes, as is the case in electrodes emplaced vertically from the surface downward.

What is claimed is:

1. An apparatus for electrically heating an in situ subsurface formation having a volume and a thickness, to remove volatile and semi-volatile hazardous waste material therefrom over a processing time, comprising:

at least n electrodes of substantially equal length each having substantially the same input resistance, and placed in a subsurface formation substantially equidistantly, wherein n is greater than the product of the volume of the formation of cubic meters, multiplied by the input resistance of an electrode in ohms, multiplied by the constant 75 kilowatt hours, divided by 20 and further divided by the processing time in hours, the effective number of electrodes within the formation being sufficient to mitigate the evaporation of water near the electrodes and increase the temperature at a mid-point between adjacent electrodes, electrical energy supply means for supplying electrical energy of opposite polarity to at least two of said electrodes, means for passing a gas into said subsurface formation, means for collecting gas, and means for removing hazardous vapors from said collected gas.

2. An apparatus according to claim 1, wherein the processing time is less than the product of the square of the thickness of the formation in meters multiplied by the constant 36 hours divided by square meters, to minimize the transfer of heat to adjacent formations and to improve the overall efficiency of the apparatus.

3. An apparatus according to claim 2, wherein the input resistance of an electrode is determined by placing a potential V between two adjacent electrodes under expected operating conditions, measuring the observed current I, and dividing the ratio V/I by two to obtain the input resistance.

4. An apparatus according to claim 2, wherein said formation has an initial resistivity prior to treatment and wherein the input resistance of an electrode is determined by the formula:

$$R = \left( \frac{1}{3} \right) \left( \frac{\rho}{2\pi L} \right) \left( \ln \frac{4L}{\alpha} \right)$$

where L is the length of the electrodes, α is the radius, and ρ is the resistivity of the formation prior to treatment.

* * * * *